United States Patent [19]

Nishitani et al.

[11] 4,395,595
[45] Jul. 26, 1983

[54] DIGITAL PUSHBUTTON SIGNALLING RECEIVER

[75] Inventors: Takao Nishitani; Tadaharu Kato, both of Tokyo, Japan

[73] Assignee: Nippon Electric Co., Ltd., Tokyo, Japan

[21] Appl. No.: 251,829

[22] Filed: Apr. 7, 1981

[30] Foreign Application Priority Data

Apr. 23, 1980 [JP] Japan ................................. 55-53893

[51] Int. Cl.$^3$ ............................................. H04M 1/50
[52] U.S. Cl. ......................... 179/84 VF; 179/15.55 R
[58] Field of Search .................. 179/84 VF, 15.55 R, 179/1 SC, 1 SD, 1 VC; 364/724

[56] References Cited

U.S. PATENT DOCUMENTS 4,107,475  8/1978  Carlqvist et al. .............. 179/84 VF Primary Examiner—G. Z. Rubinson
Assistant Examiner—James L. Dwyer
Attorney, Agent, or Firm—Sughrue, Mion, Zinn, Macpeak and Seas

[57] ABSTRACT

A digital pushbutton (PB) signalling receiver having reduced sampling frequency for reducing the operations required by digital filters. The PB receiver is responsive to an in-band audio signal digitized at a conventional sampling frequency (e.g., 8 KHz) and detects two PB frequencies, one from a lower group and one from a higher group of frequencies. The input signal is successively digitally filtered and sampled, with each sampling frequency being reduced by ½ from the preceeding sampling frequency. This results in two digitized outputs, both of which are much lower sampled digitized signals than the input, and each of which contains information corresponding to said lower and higher groups of frequencies, respectively. The two outputs are then applied to two banks of frequency detectors, comprising digital band-pass filters and energy calculating circuits, for providing an indication of the presence of the lower and higher group of frequencies in the original input signal.

5 Claims, 3 Drawing Figures

DIGITAL PUSHBUTTON SIGNALLING RECEIVER

BACKGROUND OF THE INVENTION

The present invention relates to an in-band audio multifrequency (MF) signal receiver and, more particularly, a digital pushbutton signalling receiver (hereunder referred to as a digital PB receiver) for use in a terminal device for a telephone exchange or the like system.

A digital PB receiver functioning as an in-band MF signal receiver has several advantages over an analog PB receiver in stability and precision over a long period of time under various environmental conditions such as temperature variation, aging variation, etc. In such a PB receiver, two predetermined frequencies, one of which is selected out of a lower group of frequencies (697 Hz, 770 Hz, 852 Hz, and 941 Hz), and the other of which is selected out of a higher group of frequencies (1,209 Hz, 1,336 Hz, 1,477 Hz, and 1,633 Hz), are allotted for the so-called push button telephone signals (PB signals) representing an office number and a subscriber number of a called party. Of these frequencies, 1,633 Hz is not currently used but retained for future use. Besides, dial tones of about 400 Hz may be additionally used for line connection information between said office and a subscriber of a calling party. For this reason, such a PB receiver is required to correctly detect the two desired frequencies even with any environment set, irrespective of the presence or absence of said dial tones.

A digital PB receiver employing digital filters is proposed in FIG. 1 of an article by Shiro Kikuchi et al, entitled "A Study on Digital Pushbutton Signaling Receiver", *The Transactions of the IECE of Japan*, Vol. E61, No. 8, August issue, 1978, pp. 656-657 (Reference 1). Since an audio frequency band signal containing PB signals is usually sampled at 8 KHz and converted into a digital quantity having a predetermined number of bits in a TDM (time division multiplex) telephone system, the proposed PB receiver of Reference 1 should have all its digital filters process the sampled signal at 8 KHz.

Generally, the number of arithmetic operations performed by each digital filter is proportional to the sampling frequency for each signal processed in the digital filter. Accordingly, the number of arithmetic operations required by a device using digital filters can be reduced by lowering the sampling frequency without losing needed information.

An object of the present invention, therefore, is to provide a digital PB receiver which is capable of detecting each PB signal unevenly distributed in a lowered frequency area within an audio frequency range of 0~4 KHz with a smaller number of arithmetic operations by digital processing lowering the PB signal sampling frequencies.

Another object of the invention is to provide a simplified, inexpensive digital PB receiver with less power consumption.

SUMMARY OF THE INVENTION

According to one aspect of the invention, there is provided a digital PB receiver responsive to an input in-band audio frequency signal digitized at a first sampling frequency and containing PB signals, each of which consists of one selected out of a predetermined plurality of lower group of frequencies and the other one out of a predetermined plurality of higher groups of frequencies.

The present PB receiver comprises:

means for splitting the whole frequency range of said audio frequency signal into two frequency bands in response to said digitized signal, eliminating a predetermined one of said two bands, and producing a consequent signal lying within the other one of said bands and containing both or either of the lower and higher groups of frequencies of said PB signals;

means for subjecting said consequent signal to resampling a predetermined number of times at a second sampling frequency obtained by reducing by ½ each the first sampling frequency, eliminating the frequency band signal not containing the lower and higher groups of frequencies of said PB signals, and thereby generating two sets of signals, one containing frequencies lowered corresponding to said lower group of frequencies and the other one containing frequencies lowered corresponding to said higher group of frequencies;

two sets of band-pass filter groups for detecting predetermined PB signals from said two sets of signals given from the splitting means;

means for extracting energy from the outputs of said two sets of band-pass filter groups; and means for determining said PB signals in response to the outputs of the extracting means.

The present invention enables the achievement of a new digital PB receiver designed to reduce the required amount of arithmetic operations using the well-known integer-band sampling technique for multiple stages and thereby lowering the sampling frequencies. For details of such a sampling technique, reference may be made to a paper by R. E. Crochiere et al, entitled "Digital Coding of Speech in Sub-bands," *The Bell System Technical Journal*, October issue, 1976, pp. 1069-1085 (Reference 2).

BRIEF DESCRIPTION OF THE DRAWINGS

Other features and advantages of the invention will be more apparent from the detailed description hereunder taken in conjunction with the accompanying drawings, wherein.

DETAILED DESCRIPTION OF PREFERRED EMBODIMENT

Figure 1:
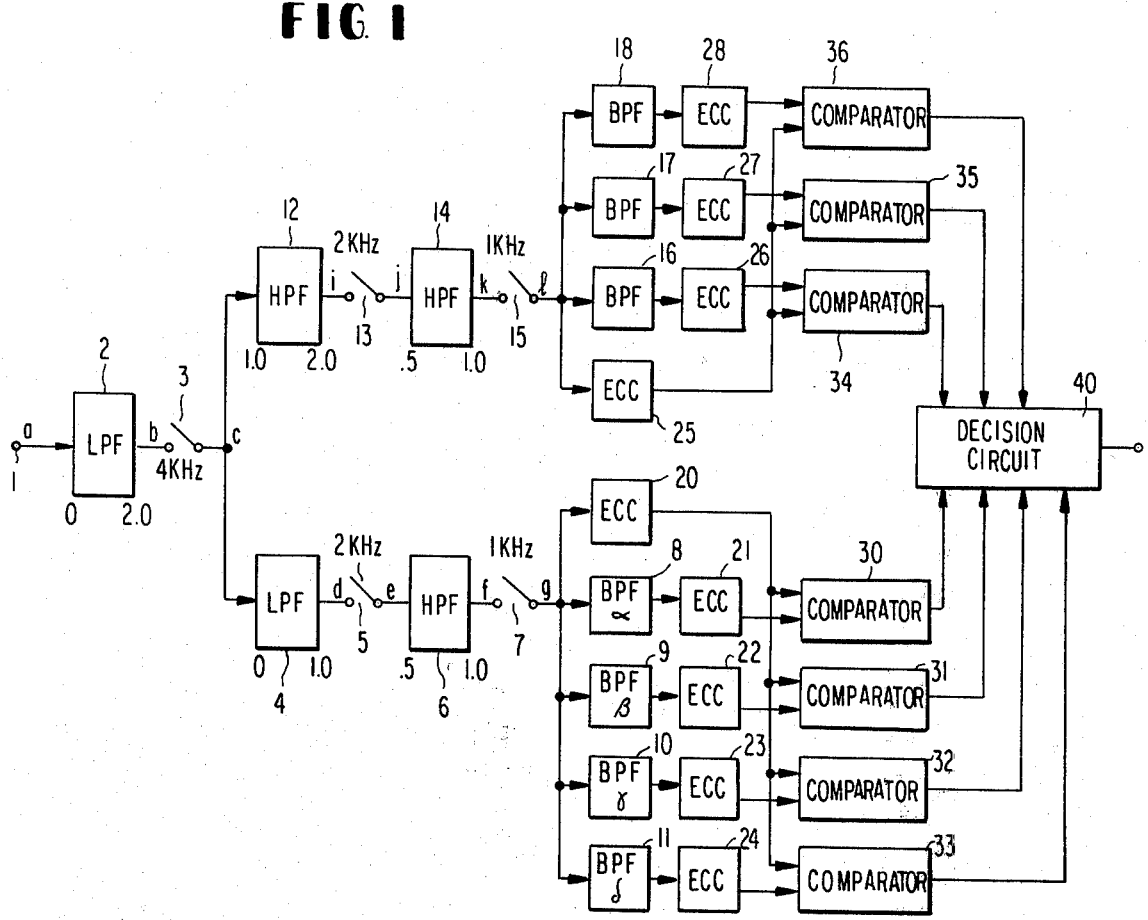
FIG. 1 is a block diagram illustrating an embodiment of the invention.

Referring to FIG. 1, one embodiment designed to detect a lower group of frequencies (697 Hz, 770 Hz, 852 Hz, and 941 Hz) and a higher group of frequencies (1,209 Hz, 1,336 Hz, and 1,477 Hz) is composed of an input terminal 1 for receiving an in-band audio frequency signal digitized through the sampling at a frequency of 8 KHz; a first low-pass filter 2; a first sampling switch 3; a second low-pass filter 4; a second sampling switch 5; a first high-pass filter 6; a third sampling switch 7; band-pass filters 8 to 11 and 16 to 18; a second high-pass filter 12; a fourth sampling switch 13; a third high-pass filter 14; a fifth sampling switch 15; energy calculating circuits 20 to 28; comparators 30 to 36; and a decision circuit 40.

Each pass band of the high-pass filters 6, 12, and 14 ranges from ¼ to ½ of the corresponding sampling frequencies of 2 KHz, 4 KHz, and 2 KHz, respectively, while those of the low-pass filters 2 and 4, from 0 Hz to ¼ of the corresponding sampling frequencies of 8 KHz and 4 KHz, respectively. For details of the high-pass filters 6, 12, and 14, the low-pass filters 2 and 4, and the band-pass filters 8, 9, 10, 11, 16, 17, and 18, reference may be made to a paper by Lawrence R. Rabiner et al, entitled "The Theory and Application of Digital Signal Processing," published in 1975 by Prentice-Hall Inc., pp. 89–105 and pp. 211–238 (Reference 3).

The energy calculating circuits 20 to 28, all of which have identical structures, will be described later in detail.

For each of the comparators 30 to 36 and the decision circuit 40, the magnitude comparator and the decoder circuit described on pages 202 and 308 in The TTL Data Manual for Design Engineers published in 1973 by Texas Instruments Inc. (Reference 4) may be used, respectively.

Figure 2:
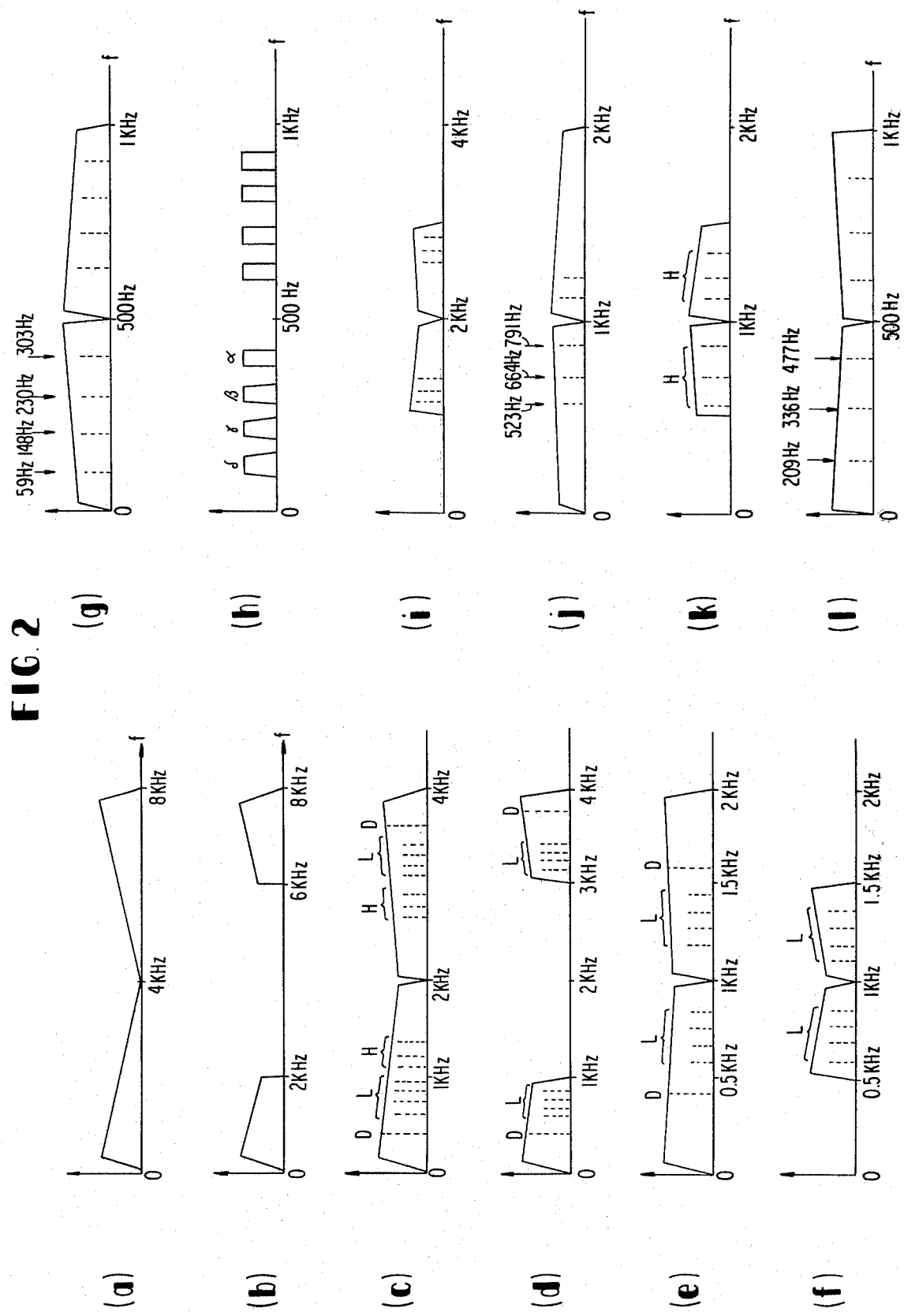
FIG. 2(a) to (l) show spectrum arrangements of signals in different parts of FIG. 1.

Next, signals appearing at different points of FIG. 1 will be described referring to FIG. 2. An 8 KHz sampled audio frequency signal having a spectrum shown in FIG. 2(a) is turned into what is illustrated in FIG. 2(b), after passing the low-pass filter 2. Since the sampling frequency of 8 KHz is then reduced to 4 KHz by the sampling switch 3, the spectrum shown in FIG. 2(b) is further turned into what is illustrated in FIG. 2(c), which means that the frequency components of FIG. 2(b) ranging from 0 to 2 KHz is folded to the 2 to 4 KHz range. In FIG. 2(c), reference letters H, L, and D represent the frequency arrangements of the higher and lower-groups of the PB signals and the dial tones, respectively.

The detection of the lower-group of frequencies will be first described hereunder. The signal having passed the switch 3 is turned into what is shown in FIG. 2(d) by the low-pass filter 4. Said sampling frequency of 4 KHz is then lowered to 2 KHz by the sampling switch 5 to have the spectrum of FIG. 2(e), which means that the frequency components of FIG. 2(d) ranging from 0 to 1 KHz is folded to the 1 to 2 KHz range.

The signal having passed the high-pass filter 6 through the switch 5 is turned into what is illustrated in FIG. 2(f). As a result, said sampling frequency of 2 KHz is lowered to 1 KHz by the sampling switch 7 to have the spectrum shown in FIG. 2(g). It is to be noted that the unnecessary dial tone components are removed by the high-pass filter 6 and that the frequency components shown in FIG. 2(f) ranging from 500 Hz to 1 KHz are folded to the 0 to 500 Hz range to have the spectrum shown in FIG. 2(g) when a signal having the frequency shown in FIG. 2(f) is resampled at a sampling frequency of 1 KHz by the sampling switch 7. As a result, the frequencies (697 Hz, 770 Hz, 852 Hz, and 941 Hz) are lowered to 303 Hz, 230 Hz, 148 Hz, and 59 Hz as shown in FIG. 2(g), respectively.

From the 1 KHz sampled signal having passed the switch 7, frequency components of 303 Hz, 230 Hz, 148 Hz, and 59 Hz respectively corresponding to 697 Hz, 770 Hz, 852 Hz, and 941 Hz are extracted by the band-pass filters 8, 9, 10, and 11, which have pass bands respectively corresponding to $\alpha$, $\beta$, $\gamma$, and $\delta$ shown in FIG. 2(h).

The signal having passed the sampling switch 7 and those having passed the filters 8, 9, 10, and 11 undergo signal energy calculation by the circuits 20, 21, 22, 23, and 24, respectively.

In each of the comparators 30 to 33, the magnitude of energy calculated by the energy calculating circuit 20 is compared with each of the corresponding magnitudes of signal calculated by the circuits 21 to 24, respectively, corresponding to 697 Hz, 770 Hz, 852 Hz, and 941 Hz. In response to the coincidence of the output of the circuit 22, which is the output of the band-pass filter 10, with the output of the circuit 20, the 770 Hz signal component is detected as a reception signal for the present receiver.

The audio frequency signal is sampled at a sampling frequency of 4 KHz by the sampling switch 3, supplied to the low-pass filter 4, and then undergoes processing to be identified with one of the lower-group of frequencies, whereas the same signal having passed the sampling switch 3 is also fed to the high-pass filter 12 to undergo processing to be identified with one of the higher group of frequencies in the following manner.

The signal spectrum (FIg. 2(c) obtained at the sampling switch 3 is turned into what is shown in FIG. 2(i) after it passes the high-pass filter 12, and is further turned into what is shown in FIG. 2(j) after the sampling at a frequency of 2 KHz by the sampling switch 13. It is to be noted that, as described in detail with reference to the processing of the lower-group of frequencies, spectral reversals take place, so that the higher-group of frequencies (1,209 Hz, 1,336 Hz, and 1,477 Hz) are lowered to 791 Hz, 664 Hz, and 523 Hz, respectively.

The signal having been sampled at a frequency of 2 KHz by the switch 13 is transformed by the high-pass filter 14 to have the spectrum of FIG. 2(k) and sampled at a frequency of 1 KHz by the sampling switch 15 to have the spectrum of FIG. 2(l). Through such processing by the use of the switch 3, filter 12, switch 13, filter 14, and switch 15, those frequencies (1,209 Hz, 1,336 Hz, and 1,477 Hz) are reduced to 209 Hz, 336 Hz, and 477 Hz, respectively.

From the signal subjected to the sampling of 1 KHz by the switch 15, frequency components of 209 Hz, 336 Hz, and 477 Hz are extracted by the band-pass filters 16, 17, and 18, respectively. The signals from these band-pass filters 16, 17, and 18 undergo signal energy calculation by the energy calculating circuits 26, 27, and 28. On the other hand, the signal having passed the switch 15 is given to the energy calculating circuit 25.

The signal energy calculated by the circuit 25 is compared by each of the comparators 34, 35, and 36 to check whether or not the processed signal consists of any one of the higher group of frequencies.

The decision circuit 40 decides, in response to the output results of the comparators 30 to 36, whether or not one frequency is selected out of 697 Hz, 770 Hz, 852 Hz and 941 Hz and another out of 1,209 Hz, 1,336 Hz, and 1,477 Hz. As a result, the frequency combination so determined decides which button has been pressed.

Figure 3:
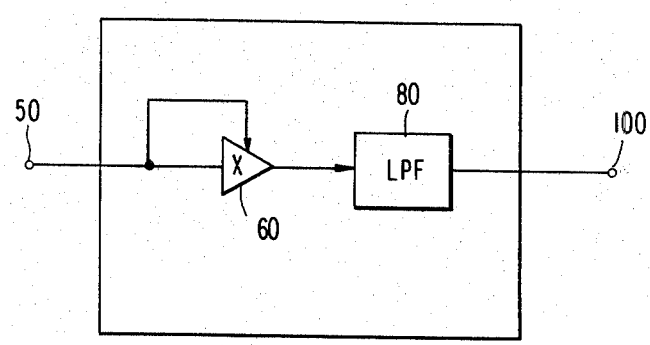
FIG. 3 is a block diagram illustrating an energy calculating circuit used in FIG. 1.

FIG. 3 illustrates an example of each of the circuits 20 to 28 referred to in FIG. 1. The shown example consists of an input terminal 50, a multiplier 60 for square calculation, a low-pass filter 80, and an output terminal 100.

In each of the circuits 20 to 28, energy (i.e., the magnitude of a given signal) is calculated as follows. The square of the given signal is taken at the multiplier 60 and fed to the low-pass filter 80, so that a direct current component may be extracted to indicate the magnitude of the signal.

As described above, the present invention permits the lowering of the sampling frequencies used in the signal processing sections. Consequently, the present receiver operates with a comparatively small number of operations as compared with that of the conventional system shown in FIG. 1 of Reference 1, which operates with one kind of the sampling frequency of 8 KHz. Simultaneously, the present invention allows the adoption of a simpler structure with less power consumption, resulting in an inexpensive receiver.

Although the foregoing description refers to the achievement of the invention by combining commonly known functional blocks, many alternatives to these blocks may be made within the scope of the invention defined by the appended claims.

What is claimed is:

1. A digital pushbutton signalling receiver responsive to an input pushbutton (PB) telephone signal digitized at a first sampling frequency and containing two frequency components, one component consisting of one frequency signal selected out of a predetermined plurality of a lower group of frequencies and a second component consisting of one frequency signal selected out of a predetermined plurality of a higher group of frequencies, comprising:

(a) first means responsive to said input signal for successively digitally filtering and resampling said input signal at selected filtering bands and successively reducing sampling frequencies by $\frac{1}{2}$ to produce a first means output digital signal containing all of said lower group of frequencies frequency transposed to first corresponding lower group of frequencies;

(b) second means responsive to said input signal for successively digitally filtering and resampling said input signal at selected filtering bands and successively reducing sampling frequencies by $\frac{1}{2}$ to produce a second means output digital signal containing all of said higher group of frequencies frequency transposed to second corresponding lower group of frequencies;

(c) a first group of digital band pass filters, each centered at different ones of said frequencies of said first corresponding lower group of frequencies, connected to receive said first means output digital signal;

(d) first energy calculating means for calculating the energy content of said first means output digital signal and the outputs from each of said first group of digital band pass filters;

(e) first comparison means responsive to the outputs from said first energy calculating means for providing an output indicating the presence and identity of any of said predetermined plurality of lower frequencies in said input in-band audio frequency signal;

(f) a second group of digital band pass filters, each centered at different ones of said frequencies of said second corresponding lower group of frequencies, connected to receive said second means output digital signal;

(g) second energy calculating means for calculating the energy content of said second means output digital signal and the outputs from each of said second group of digital band pass filters, and (h) second comparison means responsive to the outputs from said second energy calculating means for providing an output indicating the presence and identity of any of said predetermined plurality of higher frequencies in said input-in-band audio frequency signal.

2. A digital PB signalling receiver, as claimed in claim 1 wherein said first and second means comprise:

a first low pass digital filter having a pass band up to $\frac{1}{4}$ of said first sampling frequency, said input signal being applied to said first low-pass digital filter to produce an output therefrom, and first sampling means for sampling said latter output at a second sampling frequency equal to half of said first sampling frequency to provide a second sampled digitized signal having a spectrum encompassing said pluralities of lower and higher groups of frequencies.

3. A digital PB signalling receiver, as claimed in claim 2 wherein said first means further comprises:

a second digital low-pass filter connected to receive and filter said second sampled digitized signal (c) and provide an output (d) therefrom which does not contain said plurality of higher frequencies but does contain said plurality of lower frequencies, said second digital low-pass filter having a passband up to $\frac{1}{4}$ of said second sampling frequency;

third sampling means for sampling the output from said second digital low-pass filter at a third sampling frequency equal to half of said second sampling frequency to provide a third sampled digitized signal (e) having a spectrum encompassing said plurality of lower groups of frequencies;

a first digital high-pass filter connected to receive and filter said third sampled digitized signal (e) and provide an output (f) therefrom, said first digital highpass filter having a pass-band from $\frac{1}{4}$ to $\frac{1}{2}$ of said third sampling frequency; and fourth sampling means for sampling the output of said first digital high-pass filter at a fourth sampling frequency equal to half of said third sampling frequency to provide said first means output signal (g), said latter output having a spectrum which includes both said lower group of frequencies and said first corresponding lower group of frequencies, said latter group being folded with respect to said former group.

4. A digital PB signalling receiver as claimed in claim 3 wherein said second means further comprises:

a second digital high-pass filter connected to receive and filter said second sampled digitized signal (c) and provide an output (i) therefrom which contains said plurality of higher frequencies but does not contain said plurality of lower frequencies, said second digital high-pass filter having a pass-band from $\frac{1}{4}$ to $\frac{1}{2}$ of said second sampling frequency;

fifth sampling means for sampling the output (i) from said second digital high-pass filter at said third sampling frequency to provide a fifth sampled digitized signal (j) having a spectrum which includes said plurality of higher frequencies and corresponding folded lower frequencies;

a third digital high-pass filter connected to receive and filter said fifth sampled digitized signal (j) and provide an output (k) therefrom, said third digital highpass filter having a pass-band from $\frac{1}{4}$ to $\frac{1}{2}$ of said third sampling frequency; and sixth sampling means for sampling the output (k) of said third digital high-pass filter at said fourth sampling frequency to provide said second means output signal (l), said latter output having a spectrum which includes both said folded lower frequencies and further folded frequencies constituting said second corresponding lower group of frequencies.

5. A digital PB signalling receiver as claimed in claim 4 wherein:

said first, second, third, and fourth sampling frequencies are 8 KHz, 4 KHz, 2 KHz and 1 KHz, respectively;

said plurality of lower group of frequencies are in the band from 0 Hz to 1 KHz, and said plurality of higher group of frequencies are in the band from 1 KHz to 2 KHz;

said first means output has a spectrum from 0 to 500 Hz which includes said first corresponding lower group of frequencies which correspond to said plurality of lower group of frequencies; and said second means output has a spectrum from 0 to 500 Hz which includes said second corresponding lower group of frequencies which correspond to said plurality of higher group of frequencies.

* * * * *

UNITED STATES PATENT AND TRADEMARK OFFICE
CERTIFICATE OF CORRECTION

PATENT NO.   :   4,395,595
DATED        :   July 26, 1983
INVENTOR(S)  :   Takao NISHITANI et al.

It is certified that error appears in the above-identified patent and that said Letters Patent is hereby corrected as shown below:

On the cover page, in the heading of the patent, amend item [30] to read as follows:

-- Foreign Application Priority Data

Apr. 23, 1980 [JP]  Japan .............. 55-53893
Apr. 30, 1980 [JP]  Japan .............. 55-57416 --

Signed and Sealed this

Twentieth Day of December 1983

[SEAL]

Attest:

GERALD J. MOSSINGHOFF

Attesting Officer       Commissioner of Patents and Trademarks